United States Patent [19]

Nagashima

[11] Patent Number: 4,623,901

[45] Date of Patent: Nov. 18, 1986

[54] METHOD AND APPARATUS FOR PRINTING AN IMAGE

[75] Inventor: Masayoshi Nagashima, Chigasaki, Japan

[73] Assignee: Kabushiki Kaisha Toshiba, Kanagawa, Japan

[21] Appl. No.: 770,172

[22] Filed: Aug. 28, 1985

[30] Foreign Application Priority Data

Sep. 27, 1984 [JP] Japan ............................... 59-202702

[51] Int. Cl.[4] ............................................ G01D 15/10

[52] U.S. Cl. .......................... 346/76 PH; 346/139 C; 219/543; 400/120; 358/298

[58] Field of Search ................... 358/298; 346/76 PH, 346/76 R, 139 C; 219/216 PA, 543; 400/120

[56] References Cited

U.S. PATENT DOCUMENTS 3,736,406 5/1973 Vossen et al. .................. 346/76 PH
4,067,017 1/1978 Dertouzos et al. ................... 346/46
4,378,566 3/1983 Tsukamura .......................... 358/75
4,427,985 1/1984 Kikuchi et al. ...................... 346/1.1

FOREIGN PATENT DOCUMENTS 0050481 4/1982 European Pat. Off. .

*Primary Examiner*—A. Evans
*Attorney, Agent, or Firm*—Schwartz, Jeffery, Schwaab, Mack, Blumenthal & Evans

[57] ABSTRACT

A printing head comprises a substrate, a plurality of printing elements disposed on the substrate and adapted to print a picture element of an image, and a driving device for selectively driving the printing elements. Each of the printing elements includes a plurality of ring-shaped printing segments disposed on the substrate concentrically to each other. The printed area in the picture element is changed according to the printing segments selectively driven by the driving device and thus the gradation of the printed image is expressed by changing the printed area in a picture element.

15 Claims, 5 Drawing Figures

METHOD AND APPARATUS FOR PRINTING AN IMAGE

BACKGROUND OF THE INVENTION

This invention relates to a method and apparatus for printing an image and, more specifically, relates to a printing head for thermally printing an image and a printing method using the printing head.

As an example of a thermal printing apparatus, there is known a color copying machine of the thermal transfer type which reproduces a color image by using thermal transfer ink ribbons having a plurality of colorants. In a conventional apparatus of this kind, the ink ribbons are positioned opposite a copy paper, and are heated selectively by a thermal printing head which has a plurality of heating elements arranged in a line on a ceramic substrate and driving circuits disposed on the ceramic substrate in the form of a micro-package. In operation, the driving circuits provide a set of driving pulses according to the image to be printed and thus the selected heating elements are energized so that the colorants are transferred to the copy paper to form the image. Examples of such prior art machines are shown, for example, in U.S. Pat. Nos. 4,067,017; 4,378,566; and 4,427,985 and European Patent Application No. 0,050,481.

In the printing apparatus mentioned above, however, as all the colorants have the same melting point, the apparatus may not be utilized to obtain an intermediate tone or sufficient gradation. It is, therefore, known to obtain gradations in the hard copy by controlling the image density by varying the application time of the driving pulses to the thermal printing head, or by controlling the image density of printed dots by varying the number of driven heating elements assigned to form a picture element. However, the relationship between the image density and the application time of the driving pulses is not linear; thus, if a smooth gradation is to be achieved by varying the application time, complicated conditions must be met. Moreover, one picture element is defined by a plurality of recording dots. Therefore, the resolution of the printed image deteriorates when a smooth gradation is obtained by varying the number of driven heating elements.

SUMMARY OF THE INVENTION

Accordingly, it is an object of the present invention to provide a method and apparatus for printing an image which method and apparatus improve the image quality.

Another object of the present invention is to provide a method and apparatus for printing an image in which a smooth gradation is achieved.

These and other objects are achieved by providing an improved apparatus for printing an image on a recording medium including a substrate and a printing element disposed on the substrate and adapted to print a picture element. The printing element has a first printing segment and a second printing segment surrounding the first printing segment. The printing segments are selectively activatable to print an image at a desired image density. Also, means are provided for driving the printing segments so that the picture element of the image is printed on the recording medium with the desired image density.

In another aspect of the present invention, the above objects are achieved by providing a method of printing an image on a recording medium using a printing device including a substrate, a printing element disposed on the substrate and adapted to print a picture element of the image and having a first printing segment and a second printing segment surrounding the first printing segment, and means for selectively activating the first and second printing segments, comprising the steps of: disposing the printing device so as to be operative to print an image on the recording medium and selectively activating the first and second printing segments by the activating means so that the picture elements of the image change in image area according to a predetermined image density.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, in which.

DETAILED DESCRIPTION OF THE PREFERRED EMBODIMENT

Figure 1:
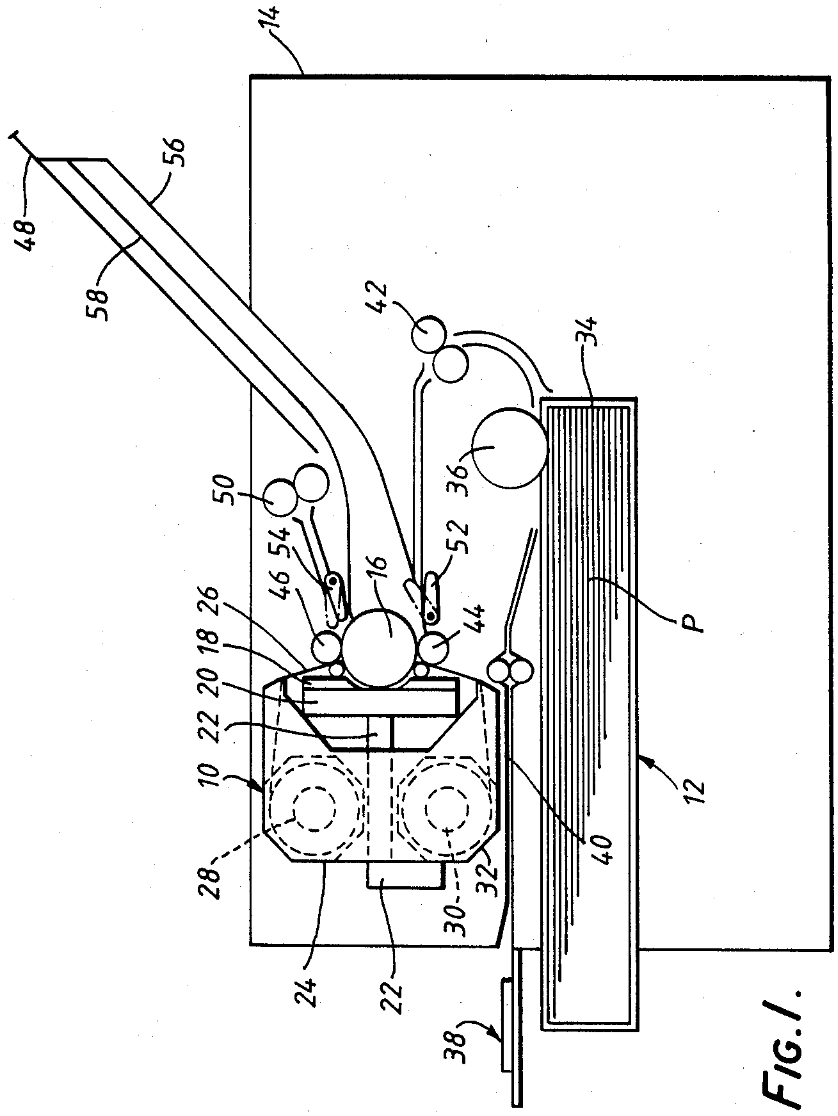
FIG. 1 is a front view of the inside of a thermal printer according to the present invention.

FIG. 1 shows the thermal printer for printing an imaqe on a recording medium according to the present invention.

Referring now to FIG. 1, the thermal printer comprises a printer unit 10 and a feeder unit 12 which are enclosed in a casing 14. A platen roller 16 is horizontally attached in the central portion of printer unit 10. A thermal head 18 is attached on the front side of platen roller 16. This thermal head 18 is secured to a radiator 20 integrally formed on a rear end surface of a holder 22. A ribbon cassette 24, which encloses a thermal transfer ink ribbon 26, is detachably installed in a holder 52 through a cassette exchange port (not shown). When ribbon cassette 24 is installed in holder 22, thermal transfer ink ribbon 26 is interposed between thermal head 18 and platen roller 16. Ribbon cassette 24 comprises a supply reel 28 and a take-up reel 30, to which both ends of ink ribbon 26 are respectively connected, and a casing 32. A portion of casing 32 is opened so that thermal transfer ink ribbon 26 is interposed between platen roller 16 and thermal head 18. When ribbon cassette 24 is installed in printer unit 10, supply reel 28 and take-up reel 30 are coupled to a drive shaft of a motor (not shown) for carrying ink ribbon 26, and are rotated. A paper feed cassette 34 in which copy papers P are stored is positioned below platen roller 16. Copy papers P in cassette 34 are picked up one-by-one due to the rotation of a feed roller 36 provided beneath and to the right of platen roller 16. Feeder unit 12 is also provided with a manual feed table 38 which may supply copy sheets to printer unit 10 through a guide-passage 40. Copy paper P, taken from cassette 34 or supplied from table 38, is aligned by a pair of rollers 42 provided above and to the right of feed roller 36. Thereafter, copy paper P is carried toward platen roller 16. Two press rollers 44 and 46 come into pressure contact with platen roller 16, and copy paper P is wrapped around platen roller 16 by rollers 44 and 46, where it is accurately set in a predetermined position for transportation. When copy paper P is received between thermal head 18 and platen roller 16, the ink coated on ink ribbon 26 is transferred from ribbon 26 onto paper P due to the heat selectively radiated from thermal head 18, so that copy images are formed on paper P. Thereafter, copy paper P is discharged onto a tray 48 through a paper discharge roller 50. Gates 52 and 54 are provided behind pressing rollers 44 and 46, so that the path of copy paper P is selectively blocked and opened. Gate 52 does not block the path when paper P is transported in the forward direction. On the other hand, when paper P is transported in the reverse direction for a second or subsequent image forming operation, gate 52 blocks the path and directs paper P toward a first guide plate 56. Until the transfer operation of the image formation is performed, gate 54 blocks the transport path so that the paper is not carried to copy discharge tray 48 but is guided toward a second guide plate 58. Thus a copy image is printed on paper P by overlapping images from each image forming operation. After that, gate 54 opens to permit paper P to be transported to tray 48. Paper feed cassette 34 may be freely attached to and detached from feeder unit 12 through the front surface thereof. In addition, manual feed table 38 permits the manual feed of paper P by hand one at a time.

The principle of thermal transfer printing will now be described. Thermal head 18 has an array of heating elements arranged in a line along the axial direction of platen roller 16 at the contact surface with platen roller 16. When copy paper P supplied from rollers 42 is inserted between platen roller 16 and ink ribbon 26, thermal head 18 presses copy paper P onto platen roller 16 through ink ribbon 26, and at the same time, the heating element array is selectively activated in accordance with image signals. The ink as the colorant on ink ribbon 26 is melted and is thermally transferred onto copy paper P on a line-by-line basis.

Figure 2:
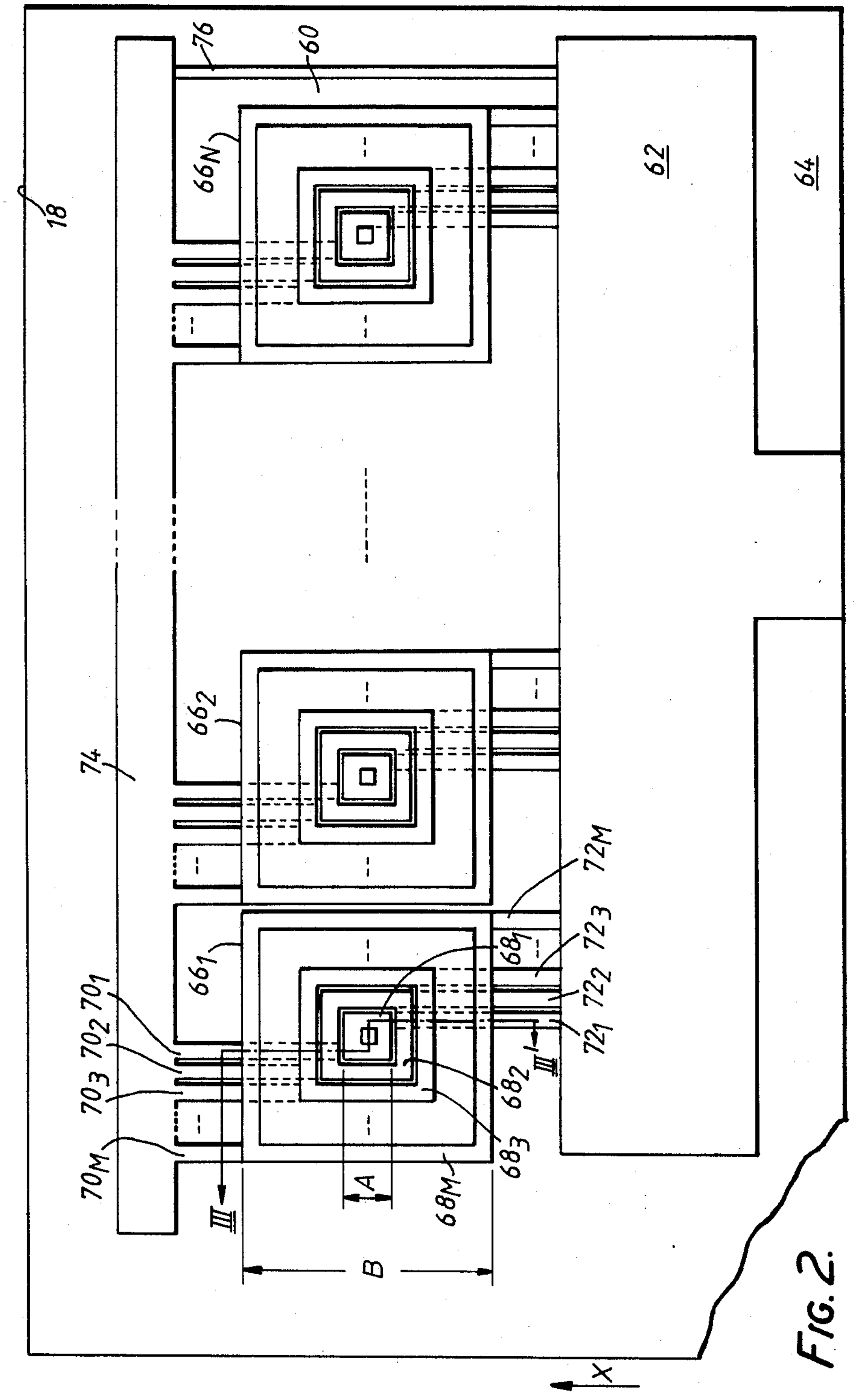
FIG. 2 is a plan view of a thermal head of the thermal printer shown in FIG. 1.

Referring to FIG. 2, the structure of thermal head 18 is illustrated. Thermal head 18 comprises a heating element array 60 and a driving circuit 62, which are integrally disposed on a ceramic substrate 64. The heating element array 60 is arranged in a horizontal line across the direction (arrow X) of transport of paper P in FIG. 2, and provided with a plurality of heating elements $66_1$–$66_N$. Each of these heating elements $66_1$–$66_N$ is adapted to print one picture element, i.e., a printing dot, and is divided into M heating segments $68_1$–$68_M$ which are ring-shaped, especially, rectangular similar figures. Heating segments $68_1$–$68_M$ are disposed so that their diameters increase one-by-one in each picture element and they are arranged concentrically. For example, the outside diameter A of the minimum heating segment 68 is set to about 25 μm and the outside diameter B of the maximum heating segment $68_M$ is set to 250 μm. A set of conductors $70_1$–$70_M$ and $72_1$–$72_M$ is furnished for heating segments $68_1$–$68_M$. Conductors $70_1$–$70_M$ are connected to a common bus 74 which is connected to driving circuit 62 through a conductor 76. Conductors $72_1$–$72_M$ are connected to driving circuit 62. Each of the heating segments $68_1$–$68_M$ includes a heating member which comprises electrically resistive materials, and the resistance and heat generating power density thereof are established at a predetermined value so that the image density printed by each of heating segments $68_1$–$68_M$ is maintained at the same value. In this example, the total number of printing segments available for each line is defined as N×M. As shown in FIG. 2, an opening is formed in the center of heating segment 68; due to the resistance of heating segment 68, however, the opening may be filled. Also, the width of the heating segments does not necessarily have to be the same.

Figure 3:
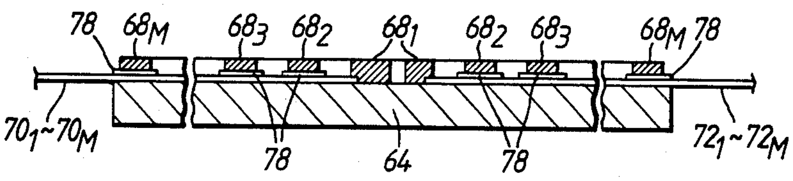
FIG. 3 is a sectional view of the thermal head.

Referring now to FIG. 3, there is shown a sectional view of the specified thermal heating element, i.e., heating element $66_1$. Conductors $70_1$–$70_M$ and $72_1$–$72_M$ for heating segments $68_1$–$68_M$ are disposed on ceramic substrate 64. Heating segment $68_1$ is formed between conductors $70_1$ and $72_1$, and the other heating segments $68_2$–$68_M$ are formed so as to surround heating segment $68_1$ in succession on ceramic substrate 64 through insulating members 78 interposed between heating segments $68_2$–$68_M$ and conductors $70_1$–$70_M$ and $72_1$–$72_M$.

Figure 4:
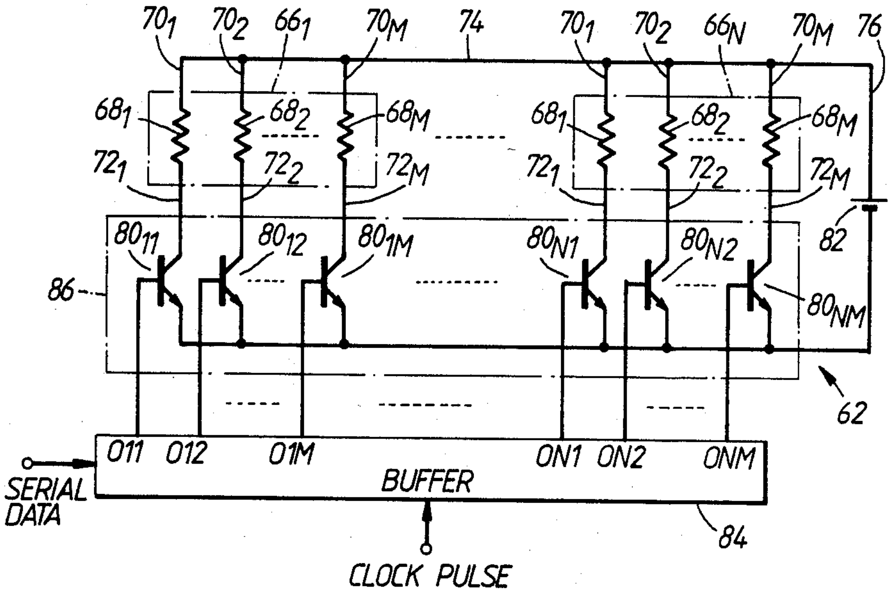
FIG. 4 is a circuit diagram of a driving circuit for driving the thermal head.

Referring to FIG. 4, an example of the driving circuit 62 for driving heating elements $66_1$–$66_N$ is illustrated. Each of the heating segments $68_1$–$68_M$ is independently connected to a collector of a transistor of the set of transistors $80_{11}$–$80_{NM}$ through one of the conductors $72_1$–$72_M$. Each heating segment is also connected to a power source 82 through one of the conductors $70_1$–$70_M$ and 76 and a common bus 74. Power source 82 is also connected to each emitter of transistors $80_{11}$–$80_{NM}$. The base of each of the transistors $80_{11}$–$80_{NM}$ is connected to one output terminal $0_{11}$–$0_{NM}$ of a buffer register 84. Transistors $80_{11}$–$80_{NM}$ are integrally formed on substrate 64 as an IC 86. Buffer 84 has an input terminal for receiving serial data of an image to be printed, output terminals $0_{11}$–$0_{NM}$ for outputting parallel data to activate each of the transistors $80_{11}$–$80_{NM}$, and an enable terminal for receiving a clock pulse input to control the printing operation so that one line is printed at a time. Buffer 84 is provided with N×M memory cells to form a shift register.

In the operation, the serial image data representing a dot pattern of an image to be printed is provided to the input terminal of buffer 84 for each printing line and then is stored therein. Next, the clock pulse is input so that the data stored in the memory cells of 84, so that a voltage is applied by power source 82 to heating segments $68_1$–$68_M$ corresponding to the activated transistors, and the heating segments generate heat to heat ink ribbon 26. Thus, ink ribbon 26 is selectively heated by the driven heating segments. As a result, the colorants coated on ink ribbon 26 are transferred to paper P supported by platen roller 16.

Figure 5:
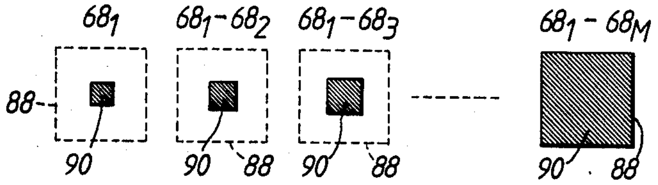
FIG. 5 is an illustration for explaining a method of expressing gradation.

As shown in FIG. 5, the image density of the printed image is established by changing the heating area in heating elements $66_1$–$66_N$, i.e., the picture area for defining the printed image changes according to the activated heating segments. Namely, a region 88 surrounded by a broken line designates the maximum heating area to be printed with one picture element, and a hatched region 90 indicates an area of the picture element colored or printed by the heating segments. In this drawing, the left end figure shows the picture element printed by heating segment $68_1$, and the right end figure shows the picture element printed by all of heating elements $68_1$–$68_M$. That is, the change of the area of the picture element is shown from left to right as the number of activated heating elements increases. Thus, gradation is achieved by changing the area in the picture elements. In the example mentioned above, the data required for achieving gradation is prepared in the image data as a dot pattern designating the heating segments to be driven.

According to the present invention, the heating area for one picture element in the printer may be changed, so that a gradation method corresponding to a screened dot change is performed. According to this method, the gradation may be achieved smoothly without any decrease of the resolution of the printed image, because it is not necessary that one picture element must be divided into a matrix. In this method, one picture element is defined by a plurality of printing segments formed in a ring-shape and disposed concentrically, so that the dot density is improved. Moreover, a linear relationship between the printed image and the screened dot change is achieved.

The shape of the heating segment may be other than square. For example, an annular segment is also acceptable. Also, the present invention may be used for printing either monochrome or colors.

In the example mentioned above, the gradation is achieved by activating the heating segments in order of segment size. On the other hand, the order may be reversed. There is no difference in the gradation. Also, the thermal head is used only as an example. This invention is not limited to such use. This invention may also be, for example, applied to electrostatic printing, wire dot printing, and ink stamp printing.

Obviously, numerous modifications and variations of the present invention are possible in light of the above teachings. It is, therefore, to be understood that within the scope of the appended claims, the invention may be practiced otherwise than as specifically described herein.

What is claimed is:

1. An apparatus for printing an image having varying tones on a recording medium transported in a predetermined direction, comprising;

a substrate;

a plurality of printing elements disposed on said substrate in a line crossing said predetermined direction and adapted to print picture elements of the image, each said printing element having a first rectangular printing segment and a second rectangular printing segment surrounding said first rectangular printing segment, said printing segments being selectively activatable to print a picture element with a desired image density; and means for driving said printing segments to produce a plurality of adjacent picture elements of the image with varying tones on the recording medium with each said picture element being produced with a desired image density corresponding to one tone by actuating a predetermined number of said printing segments.

2. An apparatus as claimed in claim 1, wherein said driving means is disposed on said substrate.

3. An apparatus as claimed in claim 1, wherein each of said printing segments includes a heating member.

4. An apparatus for printing an image having varying tones on a recording medium transported in a predetermined direction, comprising:

means for supporting the recording medium and transporting said recording medium in said predetermined direction;

means for holding an ink donor sheet coated with heat fusible ink opposite to the recording medium;

means for selectively heating said ink donor sheet in accordance with the image to be printed so as to transfer the ink to the recording medium, said heating means including a substrate and a plurality of printing elements disposed on said substrate, each of said printing elements corresponding to a picture element of the image to be printed and being composed of a first rectangular heating segment and a second rectangular heating segment surrounding said first heating segment and arranged in a line crossing said predetermined direction; and means for selectively activating said first and second heating segments for each of said printing elements so as to print a plurality of adjacent picture elements of the image with a desired image density.

5. An apparatus as claimed in claim 4, wherein said supporting means includes a roller carrying the recording medium thereon.

6. An apparatus as claimed in claim 4, wherein said printing elements are arranged in a line crossing the predetermined direction of transportation.

7. An apparatus as claimed in claim 4, wherein said holding means transports the ink donor sheet in accordance with said supporting means.

8. A method of printing an image having varying tones on a recording medium transported in a predetermined direction using a printing device having a substrate, and a plurality of printing elements disposed on said substrate in a line crossing said predetermined direction and adapted to print picture elements of the image, each said printing element having a first printing segment and a second printing segment surrounding said first printing segment, and means for selectively activating said first and second printing segments to produce different tones; said method comprising the steps of:

(a) arranging said printing device adjacent a recording medium with said plurality of printing elements arranged across said predetermined direction;

(b) selectively activating said first and second printing segments of each said printing element by said activating means to produce a plurality of picture elements having different tones in accordance with a predetermined pattern corresponding to said image;

(c) moving said recording medium in said predetermined direction; and (d) repeating steps (b) and (c) until said image is completely formed.

9. A method as claimed in claim 8, wherein said activating means is disposed on said substrate.

10. A method as claimed in claim 8, wherein said printing segments are formed in a ring-shape.

11. A method as claimed in claim 10, wherein said ring-shaped printing segments are concentrically arranged.

12. A method as claimed in claim 8, wherein each of said printing segments includes a heating member.

13. A method as claimed in claim 8 including forming a picture element having a lower density by selectively activating only one of said segments.

14. A method as claimed in claim 13 including forming a picture element having a highest density by activating all of said segments.

15. A method as claimed in claim 13 wherein said only one segment is an innermost segment.

* * * * *